United States Patent
P J (10) Patent No.: US 12,457,195 B2
(45) Date of Patent: Oct. 28, 2025

(54) HOMOMORPHIC ENCRYPTION FOR WEB APPLICATION FIREWALL PROCESSING

(71) Applicant: Salesforce, Inc., San Francisco, CA (US)

(72) Inventor: Jose Lejin P J, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 155 days.

(21) Appl. No.: 18/516,520

(22) Filed: Nov. 21, 2023

(65) Prior Publication Data

US 2025/0168146 A1    May 22, 2025

(51) Int. Cl.
*H04L 9/40* (2022.01)
*H04L 9/00* (2022.01)

(52) U.S. Cl.
CPC .......... *H04L 63/0227* (2013.01); *H04L 9/008* (2013.01)

(58) Field of Classification Search
CPC ............................ H04L 63/0227; H04L 9/008
See application file for complete search history.

(56) References Cited

U.S. PATENT DOCUMENTS

| | | | |
|---|---|---|---|
| 9,621,543 B2 * | 4/2017 | Rubin | H04L 63/0823 |
| 10,805,269 B2 * | 10/2020 | Harvey | H04L 63/0254 |
| 11,228,423 B2 * | 1/2022 | Ruan | H04L 9/0825 |
| 11,277,257 B2 * | 3/2022 | Kim | H04L 9/008 |
| 11,379,611 B1 * | 7/2022 | Horesh | H04L 9/008 |
| 11,520,459 B1 | 12/2022 | Lejin P J | |
| 11,575,501 B2 * | 2/2023 | Jeljeli | H04L 9/088 |
| 11,683,294 B2 * | 6/2023 | Mantin | H04L 9/0631 726/12 |
| D998,633 S | 9/2023 | P J | |
| 11,750,460 B1 | 9/2023 | Lejin P J | |
| D1,002,666 S | 10/2023 | P J | |
| 12,095,747 B2 * | 9/2024 | Stuntebeck | H04L 63/0464 |
| 12,273,327 B2 * | 4/2025 | Race | H04L 67/131 |
| 2018/0212756 A1 * | 7/2018 | Carr | H04L 9/008 |
| 2020/0021567 A1 * | 1/2020 | Salgaonkar | H04L 9/14 |
| 2023/0134598 A1 * | 5/2023 | Dillon | H04L 9/3247 713/176 |
| 2023/0303844 A1 | 9/2023 | Lejin P J | |
| 2025/0150436 A1 * | 5/2025 | Philip | H04L 63/0263 |

* cited by examiner

*Primary Examiner* — Viral S Lakhia
(74) *Attorney, Agent, or Firm* — Nicholson De Vos Webster & Elliott LLP (57) ABSTRACT

A method and apparatus for avoiding exposure of data that was entered into a web application in the context of having that data scanned by a third-party web application firewall (WAF). The apparatus receives, in response to forwarding a request to a web application, a response from the web application that includes a web form. The apparatus forwards the response to a browser and in response receives a second request that includes a version of the web form modified by the browser such that data entered into a plurality of fields of the web form was extracted, aggregated, and homomorphically encrypted. The apparatus causes the second request to be scanned by the third party WAF using one or more homomorphic encryption signatures, and in response to the scanning determines whether to forward the second request to the web application or take corrective action.

20 Claims, 6 Drawing Sheets

HOMOMORPHIC ENCRYPTION FOR WEB APPLICATION FIREWALL PROCESSING

TECHNICAL FIELD

One or more implementations relate to the field of Web Application Firewall processing; and more specifically, to homomorphic encryption for Web Application Firewall processing.

DESCRIPTION OF THE RELATED ART

A web application ("web app") is an application that is accessed via a web browser over a network. In a typical web app deployment, an instance of the web app runs on a server and receives requests from browsers operated by users of organizations, such as customers of the web app owner. The web app processes received requests and provides responses that are loaded in the browser. Typical deployments usually include an application gateway ("gateway") that sits on the network path between the web app hosted on the server and the browser, and handles traffic routing, load balancing and/or other functions. The gateway includes software that is: 1) part of a platform, separately deployed, and/or offered as a service (Gateway-as-a-Service); and 2) executed on dedicated hardware (e.g., a network device sometimes referred to as a gateway appliance) or on shared hardware (e.g., as a software container, virtual gateway appliance, etc.), which hardware may be located on premises and/or in the cloud (Gateway-as-a-Service). Also, a layer 7 web application firewall ("WAF") may scan traffic travelling between the browser and web app for application layer threats, such as malicious data entered into web forms. A WAF scans text entered into web forms using security signatures that identify patterns associated with different threats. Traffic identified as malicious or potentially malicious may be acted upon (e.g., blocked, further analyzed, allowed to pass but more closely monitored). A WAF includes software that is: 1) part of a platform, separately deployed, and/or offered as a service; and 2) executed on dedicated hardware (e.g., a network device sometimes referred to as a WAF appliance) or on shared hardware (e.g., as a software container, virtual WAF appliance, etc.), which hardware may be located on premises and/or in the cloud (WAF-as-a-Service).

A WAF may be considered as part of a gateway or separate from a gateway. For instance, a first entity may provide a cloud platform that includes: 1) web apps of the first entity and/or of other providers); and 2) a gateway, where the gateway employs a WAF-as-a-Service from a second entity (from the perspective of the first entity, the WAF-as-a Service is sometimes referred to as a third party WAF). As another example, a first entity may provide an intranet via an on-premises or hybrid data center that provides: 1) web apps; and 2) a gateway that employs (e.g., via a separate network device) a WAF-as-a-Service from a second entity. In this case as well, the WAF-as-a Service is referred to as a third party WAF. Also, a WAF may create log files using a logging service owned and/or operated by yet another provider.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a WAF deployment that avoids exposure of sensitive data entered into a web form to a third-party WAF. A "third-party" WAF refers to implementations where WAF functionality is provided by an entity (such as a software and/or hardware provider) other than the owner of the web app, in which case the web app owner is concerned about exposing its own data or that of its customers to the owner/operator of the WAF. For example, a first-party may provide a platform in which second-parties create and operate web apps for customers of the respective second-parties. The WAF functionality may be provided by the first-party or another party either as part of gateway or separate from gateway. In either case, the WAF provider is a third-party relative to the parties that create and operate the web apps, and these web app operators have an interest in protecting their customers' data from the WAF provider.

Additionally or alternatively, the first-party may create and operate web apps for use by customers of the first-party, and the first-party may use a different entity to provide the WAF functionality (either as part of the gateway or separate from the gateway). In that case, the first-party has an interest in protecting its customers' data from the WAF provider, as the WAF provider is still a "third-party" relative to the web app owner.

As another example, a first-party may provide an intranet via an on-premises or hybrid data center that provides: 1) web apps; and 2) a gateway that employs (e.g., via a separate network device) a WAF-as-a-Service from a second party. In this case as well, the WAF provider is a "third-party" relative to the first-party.

One type of response provided by a web app includes a web form ("form"). In response, a browser is used to populate fields of the form with data to be sent back to the web app on the server. Data entered into such forms can include sensitive data. Examples of sensitive data include personal and/or private data such as login credentials, credit card numbers, etc. but can also include many other kinds of data as determined by the web app owner. In cases where a third-party WAF is employed, sensitive data is at risk of exposure. This exposure can be mitigated by encrypting communications between a gateway and the third party WAF. However, decryption by the third-party WAF to perform WAF processing means that sensitive data may be exposed to employees of the third-party WAF and/or of a logging service owned and/or operated by yet another third-party entity, as well as a breach and/or bugs in the WAF or logging service. Alternatively, homomorphic encryption ("HE") may be used to encrypt the sensitive data before and while it is processed by the WAF. HE refers to an encryption scheme that supports operations and analysis on encrypted data as if it were in its original form. However, HE is computationally expensive and, when used repeatedly to separately encrypt data in multiple form fields, negatively affects security and performance, slowing down the web app on the user side.

Configuration

Figure 1:
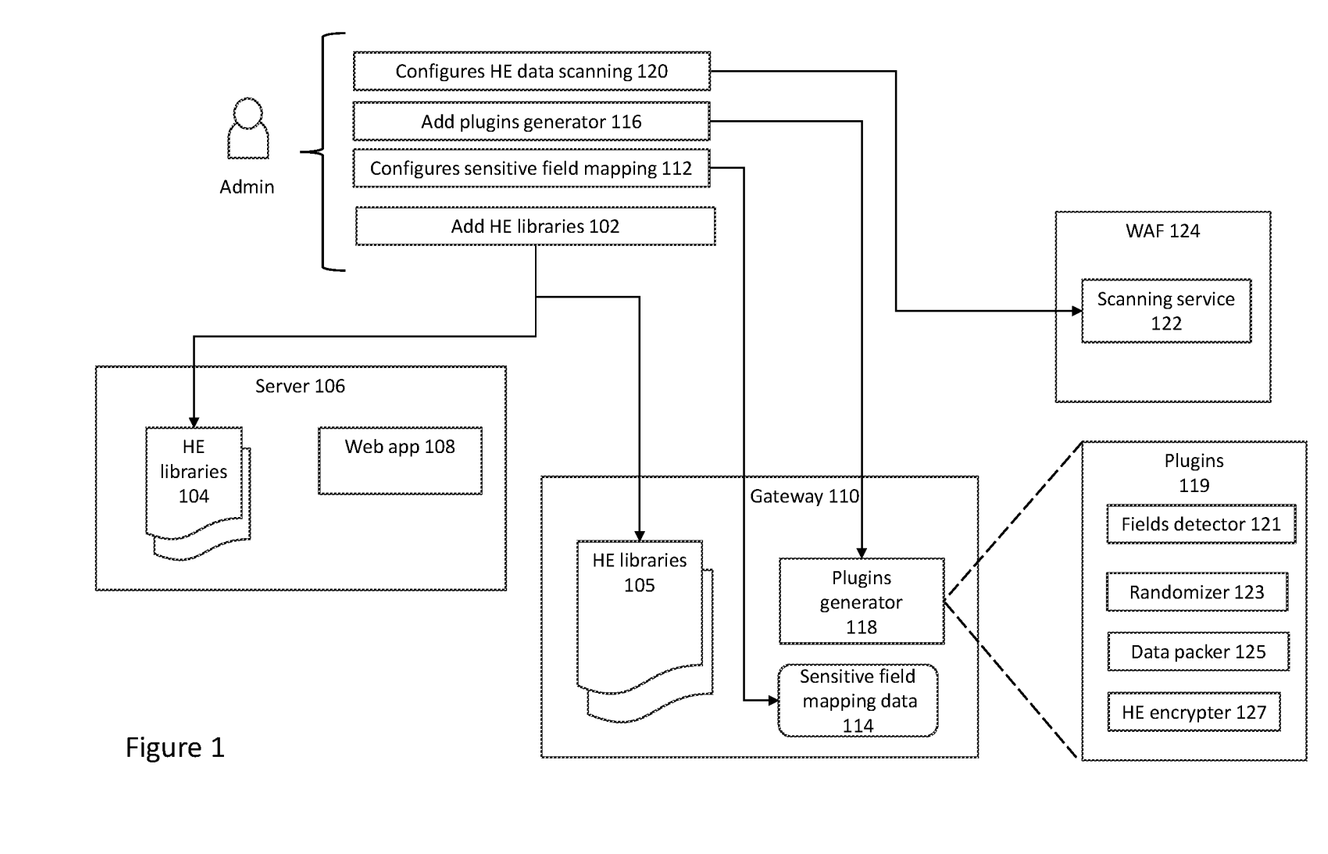
FIG. 1 is a block diagram showing the configuration of a WAF deployment according to an implementation.

FIG. 1 is a block diagram showing the configuration of a WAF deployment according to an implementation. An administrator ("admin") adds 102 HE libraries 104 and HE libraries 105 respectively to web app 108 and gateway 110. HE libraries 104 include code libraries for i) generating cryptographic key pairs consisting of a public key and private key for use with HE encryption/decryption, and ii) decrypting data that was encrypted using HE. HE libraries 105 include code libraries for encrypting data using HE. HE libraries can be third-party HE libraries that are generally available to the public and can be downloaded and installed by the web owner. Examples of third-party HE libraries include, e.g. Microsoft™ SEAL, node-seal, etc. While FIG. 1 illustrates an implementation with different HE libraries added to the web app 108 and the gateway 110, alternative implementations may add the same library to both. Admin also configures 112 gateway 110 with a mapping of all sensitive fields ("sensitive field mapping data") 114 used by different domains of web app 108. Sensitive field mapping data 114 identifies (e.g. by field name or other field identifier) for each of one or more domains used by the web app, each sensitive field in the web app of that domain. The mapping data can be entered and stored in any suitable format, such as a database record(s), object notation format, (e.g. JSON).

Admin also adds 116 to gateway 110 a plugins generator 118. Plugins generator 118 includes executable code for generating one or more browser web app plugins 119 that cause a browser web app to extract, aggregate and encrypt data that was entered into fields of a web form identified by sensitive field mapping data 114. In some implementations, the set of one or more browser web app plugins 119 includes a fields detector 121 plugin, randomizer 123 plugin, data packer 125 plugin, and HE encrypter 127 plugin, as will be further detailed below. Admin also configures scanning service 122 of WAF 124 to identify HE data in a payload (e.g. in a particular variable as will be detailed below) and scan the HE data using one or more HE signatures. The one or more HE signatures can be i) already included in the WAF, ii) added to the WAF by an admin during configuration, or iii) provided by the web app owner and published by the web app to the gateway and from the gateway to WAF during operation, as will be detailed below). Note that in some cases, as described above, gateway 110 and WAF 124 may be combined (e.g. in cases where WAF functionality is provided as part of gateway 110) in which case some of the configuration steps above can be reduced and/or combined. For example, admin may only need to add sensitive field mapping data 114, plugins generator 118, and HE libraries 105 to gateway 110. Additionally, some WAFs and/or gateways may already include HE libraries in which case adding HE libraries 105 can be skipped. Additionally, some WAFs may already be configured to scan HE data in which case admin can skip adding the extension. Furthermore, the above configuration operations may be divided amongst admins of different entities. For example, in a case where a first entity provides, either as a platform provider or as an intranet provider, the web app and the gateway, and the first entity has a relationship with a second entity providing the WAF-as-a service, an admin of the platform may add 102 the HE libraries, add 106 the plugins generator and configure 120 the HE data scanning, while an admin of the web app owner may configure 112 the sensitive field mapping. As another example, a WAF-as-a-service may already be configured for HE data scanning, in which case a gateway admin may only need to add to the gateway the HE libraries, plugin generator, and sensitive field mapping data.

Operation

Figure 2:
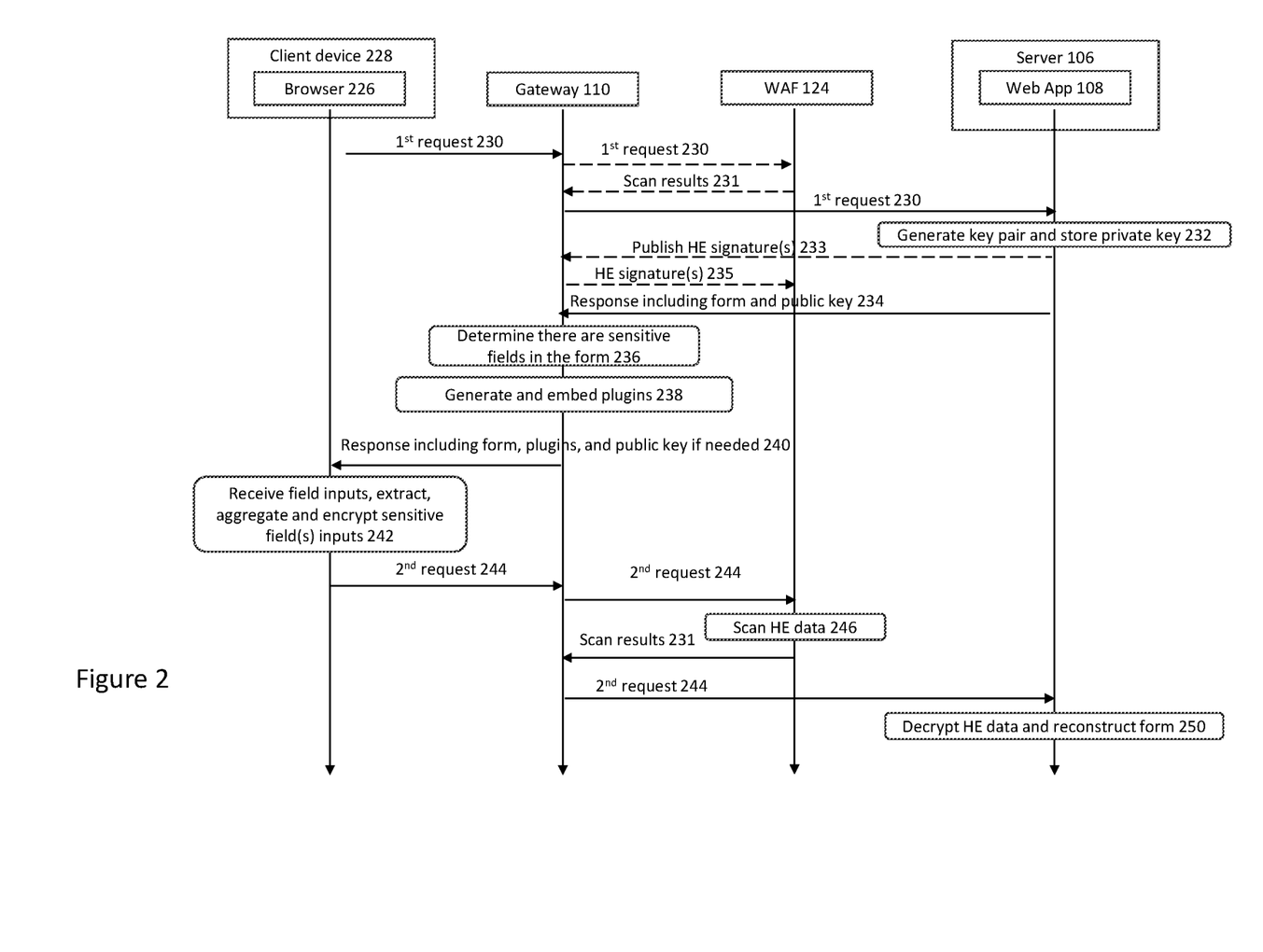
FIG. 2 is a block diagram of an operation of a WAF deployment according to an implementation.

FIG. 2 is a block diagram of an operation of a WAF deployment according to an implementation. A user (not shown) interacts with browser 226 ("browser") on client device 228 to communicate with an instance of a web app 108 on server 106. Based on input provided by the user, browser 226 generates and sends requests to the web app, and in response to those requests, receives and displays responses from the web app in the form of web pages. Input provided by the user can include an address of the web app (e.g. a URL), e.g. to initiate a session with the web app. Subsequent input provided by the user can include data entered into a web form provided by the web app.

Responsive to a first user input, browser 226 generates and sends a first request 230 to application gateway 110 for sending to web app 108. First request 230 represents a request for a web page associated with the web app.

Gateway 110 receives first request 230 and forwards first request 230 to web app 108. In some cases, depending on implementation, gateway 110 may send first request 230 to WAF 124 where it is scanned for threats prior to gateway 110 forwarding first request 230 to web app 108. In this case, WAF 124 scans first request 230. Assuming no threats are detected, WAF 124 sends 231 a result of the scanning to gateway 110 indicating that no threats are detected, and gateway 110 sends first request 230 to web app 108 for processing.

Web app 108 receives first request 230 and, in response, provides a response as per the web app flow. In some cases, per the web app flow, the response includes a web form ("form"). For the purposes of this discussion, it is assumed that the response to request 230 includes a web form. The web form includes fields in which the user is to enter data through the browser. Web app 108 also stores (e.g. in a database) a session identifier that uniquely identifies the current web app session with browser 226. Also, web app generates 232 a homomorphic encryption based cryptographic key pair consisting of a public key and a private key, and stores the private key in association with the session identifier. Web app 108 embeds the public key into the response and sends the response 234 including web form and public key to gateway 110 for forwarding to browser 226.

In some deployments, there can be many gateways and many web apps. If request 230 is the first request that web app 108 receives from gateway 110, web app also publishes 233 one or more HE signatures to gateway 110, and gateway 110 sends 235 the one or more HE signatures to WAF 124 to be used for scanning homomorphically encrypted text. For subsequent requests from gateway 110, this step is bypassed as gateway 110 will already have the one or more HE signatures. An HE signature provides the specific rules and/or patterns for the WAF to use when scanning homomorphically encrypted data. In some implementations, it is possible that WAF 124 may already have one or more HE signatures, in which case gateway 110 may only need to provide WAF 124 with the names (or other identifying information) of the particular HE signature(s) to use when scanning the HE data. Alternatively, WAF 124 may in some implementations be configured to i) always scan HE data using the same HE signature(s) or ii) decide on its own which HE signature(s) to use in, in which cases this step can be skipped.

Gateway 110 receives and processes response 234. In some implementations (not shown) gateway 110 may send response 234 to WAF 124 to be scanned prior to processing. As part of processing response 234, gateway 110 first determines 236 whether the form included in response 234 includes any sensitive fields. Gateway 110 makes this determination by i) retrieving the sensitive field mapping data 114, ii) looking up whether any sensitive fields are mapped to one or more domains of the web app. If none of the domains include mapped sensitive fields, gateway 110 forwards the response to browser without the public key (i.e. that web app embedded into the response). On the other hand, if gateway 110 determines that any domains have mapped sensitive fields, gateway invokes plugins generator 118 to generate 238 and embed in the response, a set of one or more browser web app plugins 119 that when executed at the browser cause the browser to extract, aggregate, and homomorphically encrypt data entered into the mapped sensitive fields prior to sending the form data to web app 108. The set of one or more browser web app plug-ins can be embedded into the response, e.g. using the "<script>" HTTP tag.

Gateway 110 then sends browser 226 a modified response 240 that now includes the original response 234 from web app 108 (including web form and public key) and the embedded browser web app plugins 119.

Browser 226 receives modified response 240 and displays the web form on client device 228, at which point the data is entered (e.g., manually by a user and/or by an auto fill tool/software) in the form. Data entered by a user into the form is sometimes referred to herein as "field inputs". Some of the field inputs are entered into the mapped sensitive fields. This is referred to as sensitive data. Once the completed web form is ready for submission by the browser (e.g., manually by activating a browser control or automatically by an auto fill tool/software) to web app 108 via gateway 110, web app plugins 119 execute to intercept (e.g. by overriding calls to XMLHttpRequest) the form submission and modify it before submitting it to web app 108. More specifically, the set of one or more plugins cause browser 226 to receive 242 field inputs associated with sensitive data fields, extract the field inputs from the form, and encrypt the field inputs using HE and the public key, as will be detailed below and illustrated with an example. In the example, plugins 119 include fields detector 121, randomizer 123, data packer 125, and HE encrypter 127. Fields detector 121 may be generated to identify the specific sensitive fields in the form of modified response 240. Randomizer 123 may be configured to extract data from sensitive fields and arrange the extracted data in a random order. Data packer 125 may be configured to aggregate the extracted data into a single text string, and then add indexing data to the single text string. HE encrypter 127 may be configured to encrypt the single text string using homomorphic encryption and the public key, e.g. using code provided in HE libraries 104.

An example of extracting, aggregating and encrypting data in sensitive fields at browser 226 using plugins 119 will now be provided. In the example, the term "field_id" refers to an identifier of a particular sensitive data field (which could be a field name or other identifier), while the term "value" refers to a field input of particular sensitive data field. Also, "field_id[i]" refers to the field_id of the i& sensitive data field while "value[i]" refers to the corresponding field input. Also, the $i^{th}$ field-value pair refers to the pair {field_id[i],value[i]}.

Fields detector 121 plugin cause browser 226 to i) extract the field_ids and corresponding values that were entered into the sensitive fields, ii) generate a plurality of field_id-value pairs based on the extracted data, and ii) assigns null values to the sensitive data fields in the form.

Randomizer 123 may be configured to randomize or scramble the ordering of the plurality of field_id-value pairs, for example using a randomizing temporary data structure.

Figure 3:
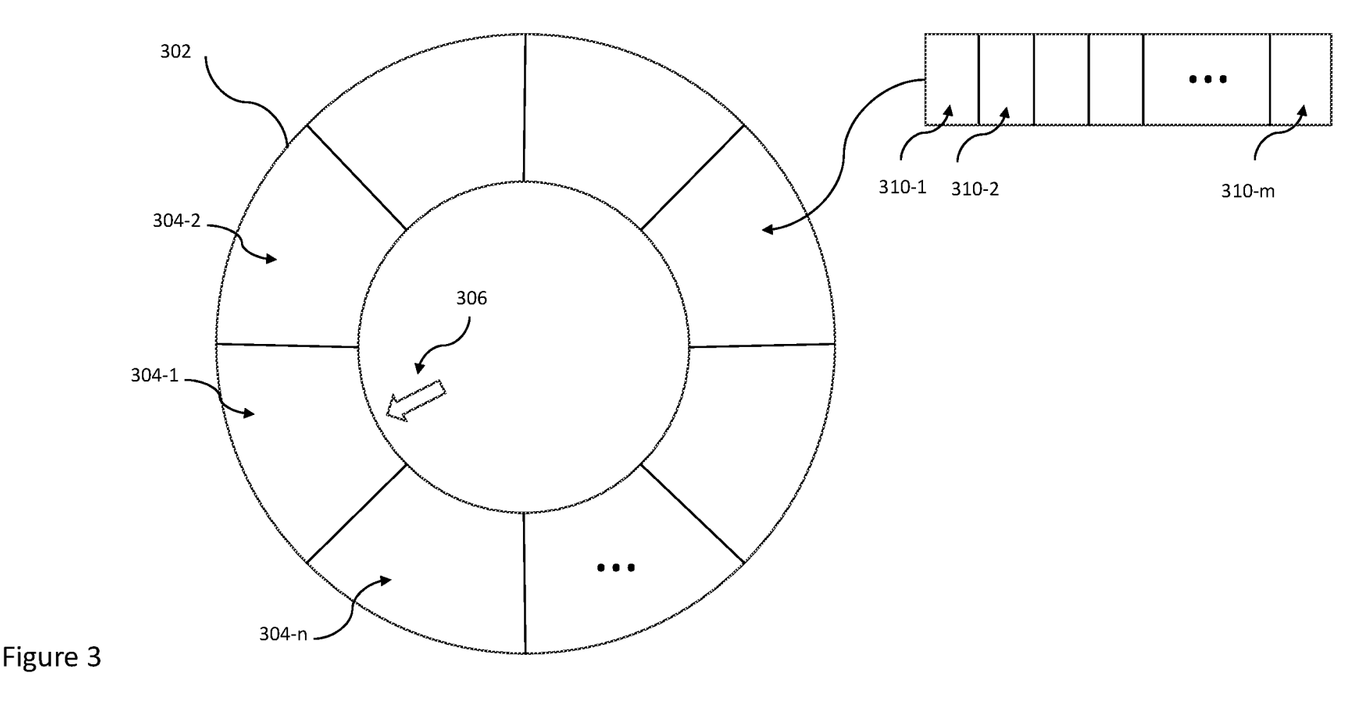
FIG. 3 shows a randomizing data structure according to some implementations.

FIG. 3 shows a randomizing data structure according to some implementations. Ring buffer 302 has n elements 304-1-304-*n*, and an insertion/extraction pointer 306 that points to the next element for loading and unloading data to/from the ring buffer. Pointer 306 is configured to be advanced (i.e. clockwise and/or counterclockwise) a random number of times (i.e. elements) each time data is loaded to ring buffer 302. In some implementations, pointer 306 may also be advanced a random number of times clockwise and/or counterclockwise, each time data is unloaded from ring buffer 302. Also, each of elements 304-1-304-*n* contain m placeholders 310-1-310-*m*. Each of placeholders 310-1-310-*m* holds a single field_id-value pair (e.g., field_id[i], value[i]). Data to be loaded into ring buffer 302 is loaded into the next available (i.e. unused) placeholder in the element pointed to by pointer 306. Each time data a pair is loaded, pointer 306 is advanced a random number of times, following which the next pair is loaded until all pairs have been loaded. In the event that the element pointed to by pointer 306 is full (i.e., there are no more available placeholders 310-1-310-*m*), pointer 306 may be continually advanced one element 304-1-304-*n* an available placeholder 310-1-310-*m* is found.

Continuing with the example, suppose a form has, in order of appearance, three sensitive data fields identified by the field_ids "SSN", "password", and "creditcard" respectively. Assume further that the corresponding values are "12345", "xyz", and "09876543" respectively:

| Field_id | Value |
|----------|-------|
| SSN | 12345 |
| password | xyz |
| creditcard | 09876543 |

Each field_id-value pair is loaded into the ring buffer, one field_id-value pair at a time. In the example above, ring buffer 302 is loaded with field_id-value pairs corresponding to {SSN,12345}, {password,xyz} and {creditcard, 09876543}.

Next, data packer 125 web app plugin unloads each pair from ring buffer 302, one at a time, and "packs" the unloaded pairs into two separate context variables which then are then combined to form a single text string. A first context variable holds a text string consisting of a concatenation of the substrings "value[1]", "value[2]", "value[i]", etc. where 1) "value[1]" represents the value of the first field_id-value pair unloaded, "value[2]" represents the value of the second field_id-value pair unloaded, etc., and 2) i represents the total number of field_id-value pairs.

The second context variable holds a text string consisting of a concatenation of the substrings "field_id[1]:[$j_1$, $k_1$]", "field_id[2]:[$j_2$, $k_2$]", "field_id[i]:[$j_i$, $k_i$]", etc. where: 1) "field_id[1]" represents the field_id of the first field_id-value pair unloaded, "field_id[2]" represents the field_id of the second field_id-value pair unloaded, etc., 2) $j_i$ represents the character "start" position of the substring "value[i]" in the first context variable, and 3) $k_i$ represents the character "end" position of the substring "value[i]" in the first context variable. The two context variables are then combined to form a single text string.

For example, assume the first context variable is named "HomomorphicDataPack" and the second context variable is named "HomomorphicDataIndex" (although it will be appreciated that any variable names can be used). Assume also that the order in which the data is unloaded from ring buffer 302 is {password,xyz}, followed by {SSN,12345}, followed by {creditcard,09876543}. After the first iteration of unloading and packing, the two context variables hold the following values:

| HomomorphicDataPack | HomomorphicDataIndex |
|---|---|
| xyz | password:[0,2] |

In this case "password:[0,2]" represents indexing data that informs that the substring that identifies the "value" corresponding to the "password" field appears in HomomorphicDataPack at starting position "0" (representing the first character, or "x") and ending position "2" (representing the third character, "z").

Continuing with the example, after the second iteration of unloading and packing the context variables now hold the following values:

| HomomorphicDataPack | HomomorphicDataIndex |
|---|---|
| xyz12345 | password:[0,2]SSN:[3,7] |

This indicates, in addition to what was stated above, the substring that identifies the value corresponding to the "SSN" field appears in HomomorphicDataPack at starting position "3" and ending position "7". Finally, after the third and final iteration, the context variables now hold the following values:

| HomomorphicDataPack | HomomorphicDataIndex |
|---|---|
| xyz1234509876543 | password:[0,2]SSN:[3,7]creditcard:[8,15] |

This indicates, in addition to what was stated above, that the substring that identifies the value corresponding to the "creditcard" field appears in HomomorphicDataPack at starting position "8" and ending position "15".

Next, the two context variables are aggregated and combined into a new variable "HomomorphicData" such that:

HomomorphicData=HomomorphicDataPack {HomomorphicDataIndex}

In the above example, HomomorphicData would contain the aggregated data (without quotation marks): "xyz1234509876543{password:[0,2]SSN:[3,7]creditcard:[8,15]}". Note that in the above example curly braces ("{ }") are used to illustrate one way of combining the two context variables such that a distinction can be made between the "values" portion of the single text string and the "indexing data" portion of the single text string. In the above example the end brace can also be omitted. In practice, other methods are equally possible.

Next, HE encrypter 127 web app plugin encrypts, using HE libraries 104 and the public key provided by web app 108, the HomomorphicData text string. Thus, all of the sensitive data in the form can be homomorphically encrypted using a single function call to an HE encrypter function, thereby saving computational resources and minimizing any negative performance that would result from multiple calls to an HE encrypter function for multiple field inputs. Additionally, it should be noted that the encrypted string does not contain delimiters between field inputs, and furthermore the order of the field inputs does not follow the order in which the fields appear in the form. This adds an extra layer of security should an enterprising hacker attempt to analyze the encrypted text string and try to discern a recurring pattern.

Next, browser 226 generates a second request 244 for sending to web app 108 via gateway 110. Second request 244 includes a modified version of the web form data in which sensitive data fields are nulled. Also, second request 244 includes a variable in which is the single HE-encrypted text string containing the aggregated and encrypted field inputs and indexing data. Browser 226 sends second request 244 to gateway 110, and gateway 110 sends second request 244 to WAF 124.

WAF 124 receives second request 244, distinguishes the HE-encrypted text string ("HE data") from the other form data (e.g. by identifying a particular variable (e.g. "HomomorphicData") in the payload that is known to contain HE data), performs a scan on the other form data using non-HE signature(s), and performs a scan 246 of the single HE-encrypted text string ("HE data") using the one or more HE signatures. WAF 124 may already have the one or more HE signatures (e.g., gateway 110 already provided the HE signature(s) that was published by web app 108). Alternatively, if WAF 124 does not already have the HE signature(s), WAF 124 can either request ("pull") the HE signature(s) from gateway 110, or gateway 110 can send ("push") the HE signature(s) to WAF 124. Advantageously, using the one or more HE signatures to scan HE-encrypted form data, WAF 124 can analyze the sensitive data entered into the form and detect malicious data even though this data is not decrypted (neither WAF 124 nor a third-party log service can "see" or store the actual sensitive data). As such, sensitive data is prevented from being exposed to third parties.

Next, WAF 124 sends 231 a result of the scanning to gateway 110. Depending on the result of the scanning, gateway 110 either allows second request 244 to reach web app 108 or takes corrective action. Corrective action may include one or more of blocking second request 244 from reaching web app 108, allowing the request to reach the web app but monitoring it more closely, blocking browser 226 and/or client device 228 from communicating with web app 108 and/or server 106, triggering an alert to be sent to an admin, or another corrective action as may be determined by rules implemented by gateway 110.

Assuming the results of scanning indicate that no threats are detected, gateway 110 sends second request 244 to web app 108. Web app 108 reads the custom variable containing the HE data (e.g., the HomomorphicData variable in the example) and decrypts 250 the HE data and reconstructs the form. Web app 108 uses code included in HE libraries 104 and the stored private key associated with the session identifier to decrypt the HE data. Web app 108 then uses the indexing data in the decrypted string to reconstruct the original web form data by extracting each value associated with each field_id and inserting the extracted values in the proper form field. Web app 108 then processes the request included reconstructed form and provides a response.

Figure 4:
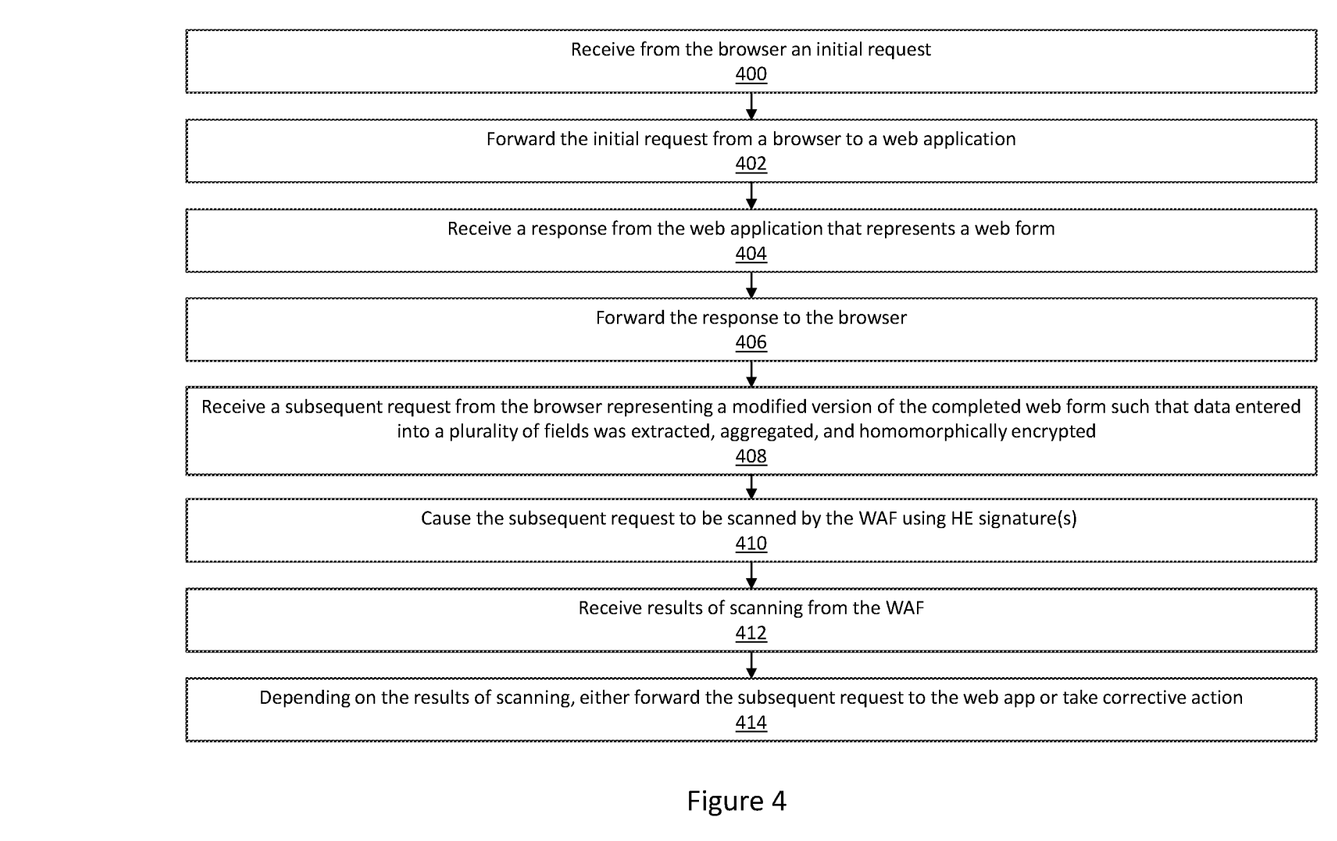
FIG. 4 is a flow diagram showing a method, implemented at gateway 110, for avoiding exposure of data that was entered into a form on web browser on a client device for transmission to a web application.

FIG. 4 is a flow diagram showing a method, implemented at gateway 110, for avoiding exposure of data that was entered into a form on web browser on a client device for transmission to a web application on a server.

In block 400, gateway 110 receives from the browser an initial request for a web application, and in block 402, gateway 110 forwards the initial request received from the browser to a web application.

In block 404, gateway 110 receives a response from the web application that represents a web form. The web form includes sensitive data fields. The response may include a public key for homomorphically encrypting sensitive data at the browser.

In block 406, gateway 110 forwards the response to the browser. Gateway 110 also includes, with the response, custom generated web app plugins for causing the browser to extract, aggregate, and homomorphically encrypt, using the public key, data that was entered into fields identified as sensitive data fields. In some implementations, gateway generates at least one browser web app plugin based on a stored mapping of sensitive data fields to domains of the web application.

In block 408, gateway 110 receives a subsequent request from the browser representing a modified version of the completed web form such that data entered into a plurality of fields was extracted, aggregated, and homomorphically encrypted.

In block 410, gateway 110 causes the subsequent request to be scanned by the WAF using one or more HE signatures. In block 412, gateway 110 receives the results of the scanning from the WAF, and in block 414, gateway 110 either forwards the subsequent request to the web app or takes corrective action depending on the results of scanning.

Figure 5:
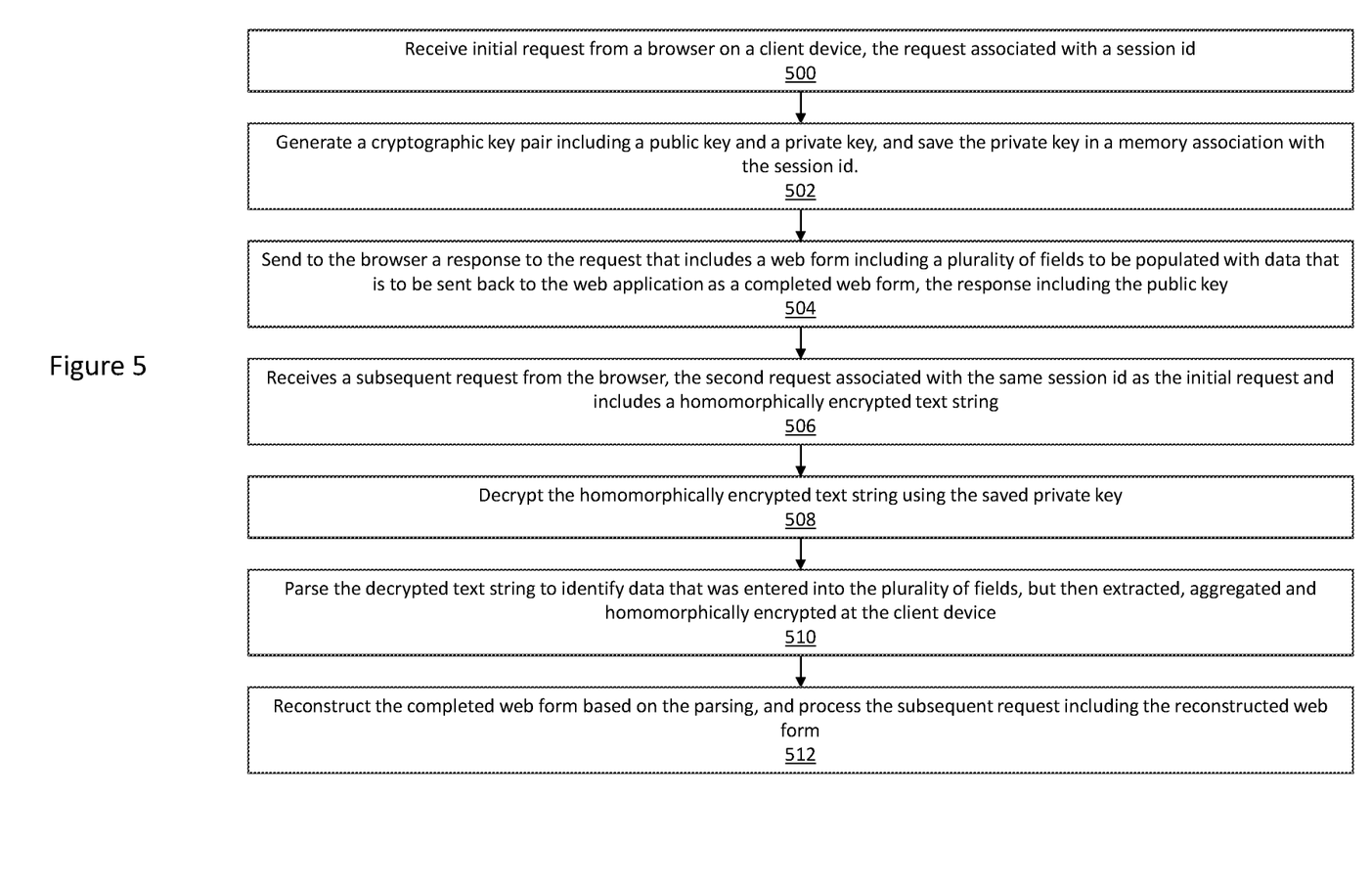
FIG. 5 is a flow diagram showing a method, implemented at server 106, for avoiding exposure of data that was entered into a form on web browser on a client device for transmission to the web application.

FIG. 5 is a flow diagram showing a method, implemented at an electronic device for avoiding exposure of data that was entered into a web app form on web browser on a client device for transmission to the web application. In block 500, the electronic device receives an initial request for a web application from a browser on a client device. The initial request is associated with a session id.

In block 502, responsive to the initial request, the electronic device generates a homomorphic encryption based cryptographic key pair including a public key and a private key, and saves the private key in a memory in association with the session id. This operation can be skipped for subsequent requests associated with the same session id. For example, a lookup can be performed on the session id to determine if a private key already exists for this session, in which case the key pair has already been generated and block 502 can be skipped.

In block 504, the electronic device sends to the browser on the client device, a response to the initial request that includes a web form. The web form includes a plurality of fields to be populated with data and is to be sent back to the web application as a completed web form. If a key pair was generated in block 502, the response also includes the public key.

In block 506, the electronic device receives a subsequent request for a web application from the browser on a client device. The subsequent request is associated with the same session id as the initial request and includes a homomorphically encrypted text string.

In block 508, an electronic device decrypts the homomorphically encrypted text string using the saved private key associated with the same session id. In block 510, electronic device parses the decrypted text string to identify data that was entered into the plurality of fields, and that was extracted, aggregated and homomorphically encrypted at the client device. The decrypted text string also provides an indication of which of the data belongs in which of the plurality of fields.

In block 512, the electronic device reconstructs the completed web form's original data based on the parsing and processes the subsequent request including the reconstructed completed web form.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients. For example, server 106 provides a service via web app 108.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
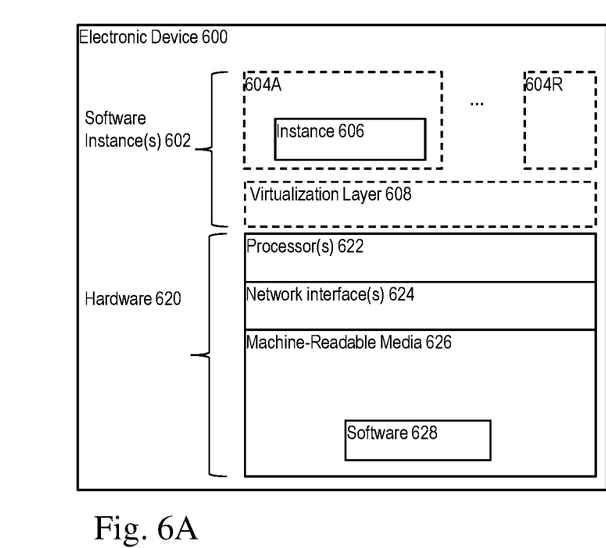
FIG. 6A is a block diagram illustrating an electronic device 600 according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and services may be implemented in one or more of electronic device 600. In one implementation: 1) each of the clients is implemented in a separate one of the electronic device 600 (e.g., in end user devices where the software 628 represents the software to implement clients to interface directly and/or indirectly with the services (e.g., software 628 represents a web browser, a native client, a portal, a command-line interface, and/or an application programming interface (API) based upon protocols such as Simple Object Access Protocol (SOAP), Representational State Transfer (REST), etc.)); 2) the services are implemented in a separate set of one or more of electronic device 600 (e.g., a set of one or more server devices where the software 628 represents the software to implement the services); and 3) in operation, the electronic devices implementing the clients and the services would be communicatively coupled (e.g., by a network) and would establish between them (or through one or more other layers and/or or other services) connections for submitting web application requests through browsers and returning web application responses to the clients. Other configurations of electronic devices may be used in other implementations (e.g., an implementation in which the client and the services are implemented on a single one of electronic device 600).

Similarly, gateway 110 and WAF 124 may be implemented in one or more of electronic device 600. In one implementation: 1) gateway 110 is implemented in a separate set of one or more of electronic device 600 (e.g., a set of one or more server devices where the software 628 represents the software to implement the gateway); and 2) WAF 124 is implemented in a separate set of one or more of electronic device 600 (e.g., a set of one or more server devices where the software 628 represents the software to implement the scanning service 122).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and a set of one or more software containers, shown as software container 604A to software container 604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. Instances of the software 628, as well as the virtualization layer 608 and the software containers if implemented, are collectively referred to as software instance(s) 602.

Alternative implementations of an electronic device may have numerous variations from that described above. For example, customized hardware and/or accelerators might also be used in an electronic device.

Example Environment

Figure 6B:
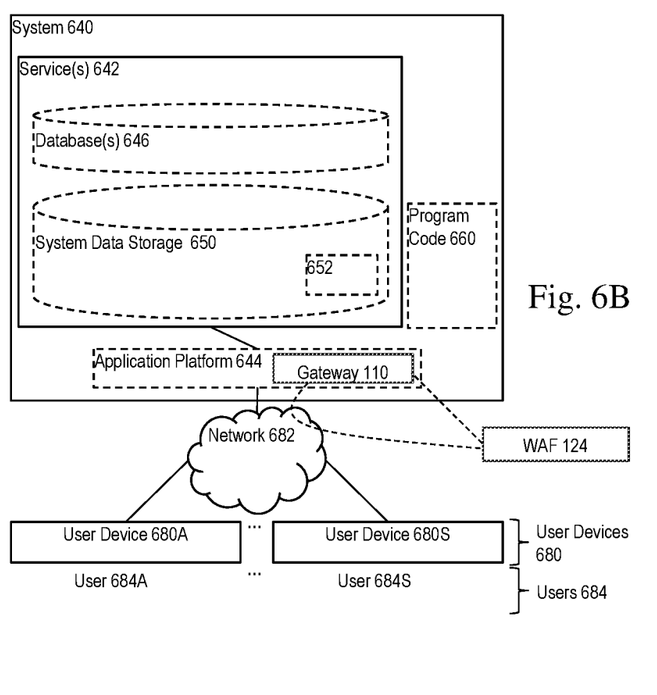
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including web app 108. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680 (shown as user device 680A to user device 680S) over a network 682. The service(s) 642 may be on-demand services that are made available to users 684 (shown as user 684A to user 684S) working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users). The service(s) 642 may communicate with each other and/or with one or more of the user devices 680 via one or more APIs (e.g., a REST API). In some implementations, the user devices 680 are operated by the users 684, and each may be operated as a client device and/or a server device. In some implementations, one or more of the user devices 680 are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant typically includes a group of users with access to at least some of the same data/functionality with the same or similar privileges/permissions. Tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include software instance(s) that are shared by multiple tenants (e.g., a single database instance share by multiple tenants, sometime referred to as a multi-tenant database; a single application instance shared by multiple tenants, sometimes referred to as a multi-tenant application; a single application instance and a single database instance shared by multiple tenants; an application instance per tenant and a database instance shared by multiple tenants; a single application instance share by multiple tenants and a database instance per tenant).

In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of the user devices 680, or third-party application developers accessing the system 640 via one or more of user devices 680.

In some implementations, one or more of the service(s) 642 may use one or more database(s) 646 and/or system data storage 650 (which stores system data 652). In certain implementations, the system 640 includes a set of one or more servers that are running on server electronic devices and that are configured to handle requests for any authorized user associated with any tenant (there is no server affinity for a user and/or tenant to a specific server). The user devices 680 communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the database(s) 646 and/or system data storage 650.

In some implementations, the service(s) 642 are implemented using virtual applications dynamically created at run time responsive to queries from the user devices 680 and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others.

Further, in one implementation, the application platform 644 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Relative to FIG. 1, a first-party may provide application platform 644 that includes gateway 110, where gateway 110 employs WAF 124 provided by another party (WAF-as-a-service). In either case, the WAF provider is a third-party relative to the parties that create and operate the web apps, and these web app operators have an interest in protecting their customers' data from the WAF provider.

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680.

Each of the user devices 680 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684 to interact with various GUI pages that may be presented to the one or more of users 684. The user devices 680 may communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more the user devices 680 may include an HTTP client, commonly referred to as a "browser," for sending and receiving HTTP messages to and from server(s) of system 640, thus allowing one or more of the users 684 to access, process and view information, pages and applications available from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for avoiding exposure of data that was entered into a web application running in a web browser on a client device for transmission to a web application on a server device in the context of having that data scanned by a third-party web application firewall (WAF) before reaching the server device, comprising, at an electronic device:
   responsive to forwarding a first request from the browser to the web application, receiving a response from the web application that includes a web form;
   forwarding the response to the browser;
   responsive to forwarding the response to the browser, receiving a second request from the browser, wherein the second request includes a version of the web form that was completed at the browser but modified by the browser, wherein the modification included:
      generation of a first text string through extraction and aggregation of data entered into a plurality of fields of the web form;
      generation of a second text string representing indexing data for the first text string;
      generation of third text string through combination of the first text string and the second text string;
      homomorphic encryption, using a public key provided by the web application, of the third text string to form a homomorphically encrypted aggregation of the data entered into the plurality of fields; and
      addition to the second request of the homomorphically encrypted aggregation of the data entered into the plurality of fields;
   causing the second request to be scanned by the third party WAF using one or more homomorphic encryption signatures provided by the web application on the homomorphically encrypted aggregation of the data entered into the plurality of fields; and
   depending on the scanning, determining whether to forward the second request to the web application or take corrective action.

2. The method of claim 1, further comprising:
   generating a set of one or more browser web app plugins configured to cause the browser to make the modification; and
   modifying the response prior to the forwarding to the browser to include the generated set of web app plugins.

3. The method of claim 2, further comprising:
   retrieving, from a database, mapping data that identifies the plurality of fields, wherein at least one of the plugins of the set of plugins is generated based at least in part on the retrieved mapping data.

4. The method of claim 2, wherein the set of one or more browser web app plugins cause the browser to:
   extract, from the web form, the data entered into each of the plurality of fields and null the data entered into each of the plurality of fields in the web form;
   generate a plurality of field-value pairs, each field-value pair including a first value corresponding to an identifier of a field of one of the plurality of fields, and a second value corresponding to the data that was extracted from the field identified by the first value;
   generate, based on the plurality of field-value pairs, the first text string representing an aggregation of all the second values in the plurality of field-value pairs.

5. The method of claim 4, wherein the set of one or more browser web app plugins cause the browser to randomize an ordering of the aggregated second values in the first text string.

6. The method of claim 4, wherein the set of one or more browser web app plugins cause the browser to:
   generate a ring buffer having a plurality of elements, and a pointer that points to a next element where data is to be inserted or extracted;
   load each field-value pair, one pair at a time, into the ring buffer at the element pointed to by the pointer, where the pointer is advanced a random number of times between each pair to be loaded;
   after all the field-value pairs have been loaded into the ring buffer, extract each field-value pair, one pair at a time, from the ring buffer at the element pointed to by the pointer, where the pointer is advanced a random number of times between each pair to be extracted; and
   for each extracted field-value pair, appending the second value to the first text string and appending, to the second text string, the first value followed by data that provides information on the location of the second value within the first text string.

7. The method of claim 1, wherein the response from the web application on the server device includes the public key.

8. An apparatus comprising:
   a set of one or more processors; and
   a non-transitory machine-readable storage medium that provides instructions that, if executed by the set of one or more processors, are configurable to cause the apparatus to perform operations for avoiding exposure of data that was entered into a web application running in a web browser on a client device for transmission to a web application on a server device in the context of having that data scanned by a third-party web application firewall (WAF) before reaching the server device, the operations comprising:
      responsive to forwarding a first request from the browser to the web application, receiving a response from the web application that includes a web form;
      forwarding the response to the browser;
      responsive to forwarding the response to the browser, receiving a second request from the browser, wherein the second request includes a version of the web form that was completed at the browser but modified by the browser, wherein the modification included:
         generation of a first text string through extraction and aggregation of data entered into a plurality of fields of the web form;
         generation of a second text string representing indexing data for the first text string;

generation of third text string through combination of the first text string and the second text string;

homomorphic encryption, using a public key provided by the web application, of the third text string to form a homomorphically encrypted aggregation of the data entered into the plurality of fields; and causing the second request to be scanned by the third party WAF using one or more homomorphic encryption signatures provided by the web application on the homomorphically encrypted aggregation of the data entered into the plurality of fields; and depending on the scanning, determining whether to forward the second request to the web application or take corrective action.

9. The apparatus of claim 8, the operations further comprising:

generating a set of one or more browser web app plugins configured to cause the browser to make the modification; and modifying the response prior to the forwarding to the browser to include the generated set of plugins.

10. The apparatus of claim 9, the operations further comprising:

retrieving, from a database, mapping data that identifies the plurality of fields, wherein at least one of the plugins of the set of plugins is generated based at least in part on the retrieved mapping data.

11. The apparatus of claim 9, wherein the set of one or more browser web app plugins cause the browser to:

extract, from the web form, the data entered into each of the plurality of fields and null the data entered into each of the plurality of fields in the web form;

generate a plurality of field-value pairs, each field-value pair including a first value corresponding to an identifier of a field of one of the plurality of fields, and a second value corresponding to the data that was extracted from the field identified by the first value;

generate, based on the plurality of field-value pairs, the first text string representing an aggregation of all the second values in the plurality of field-value pairs.

12. The apparatus of claim 11, wherein the set of one or more browser web app plugins cause the browser to randomize an ordering of the aggregated second values in the first text string.

13. The apparatus of claim 11, wherein the set of one or more browser web app plugins cause the browser to:

generate a ring buffer having a plurality of elements, and a pointer that points to a next element where data is to be inserted or extracted;

load each field-value pair, one pair at a time, into the ring buffer at the element pointed to by the pointer, where the pointer is advanced a random number of times clockwise and/or counterclockwise between each pair to be loaded;

after all the field-value pairs have been loaded into the ring buffer, extract each field-value pair, one pair at a time, from the ring buffer at the element pointed to by the pointer, where the pointer is advanced a random number of times between each pair to be extracted; and for each extracted field-value pair, appending the second value to the first text string and appending, to the second text string, the first value followed by data that provides information on the location of the second value within the first text string.

14. The apparatus of claim 8, wherein the response from the web application includes the public key.

15. An article of manufacture comprising:

a non-transitory machine-readable storage medium that provides instructions that, if executed by a set of one or more processors implemented in an electronic device, are configurable to cause the electronic device to perform operations for avoiding exposure of data that was entered into a web application running in a web browser on a client device for transmission to a web application on a server device in the context of having that data scanned by a third-party web application firewall (WAF) before reaching the server device, the operations comprising:

responsive to forwarding a first request from the browser to the web application, receiving a response from the web application that includes a web form;

forwarding the response to the browser;

responsive to forwarding the response to the browser, receiving a second request from the browser, wherein the second request includes a version of the web form that was completed at the browser but modified by the browser wherein the modification included:

generation of a first text string through extraction and aggregation of data entered into a plurality of fields of the web form;

generation of a second text string representing indexing data for the first text string;

generation of third text string through combination of the first text string and the second text string;

homomorphic encryption, using a public key provided by the web application, of the third text string to form a homomorphically encrypted aggregation of the data entered into the plurality of fields; and causing the second request to be scanned by the third party WAF using one or more homomorphic encryption signatures provided by the web application on the homomorphically encrypted aggregation of the data entered into the plurality of fields; and depending on the scanning, determining whether to forward the second request to the web application or take corrective action.

16. The article of manufacture of claim 15, the operations further comprising:

generating a set of one or more browser web app plugins configured to cause the browser to make the modification; and modifying the response prior to the forwarding to the browser to include the generated set of plugins.

17. The article of manufacture of claim 16, the operations further comprising:

retrieving, from a database, mapping data that identifies the plurality of fields, wherein at least one of the plugins of the set of plugins is generated based at least in part on the retrieved mapping data.

18. The article of manufacture of claim 16, wherein the set of one or more browser web app plugins cause the browser to:

extract, from the web form, the data entered into each of the plurality of fields and null the data entered into each of the plurality of fields in the web form;

generate a plurality of field-value pairs, each field-value pair including a first value corresponding to an identifier of a field of one of the plurality of fields, and a second value corresponding to the data that was extracted from the field identified by the first value;

generate, based on the plurality of field-value pairs, the first text string representing an aggregation of all the second values in the plurality of field-value pairs.

19. The article of manufacture of claim 18, wherein the set of one or more browser web app plugins cause the browser to randomize an ordering of the aggregated second values in the first text string.

20. The article of manufacture of claim 18, wherein the set of one or more browser web app plugins cause the browser to:
- generate a ring buffer having a plurality of elements, and a pointer that points to a next element where data is to be inserted or extracted;
- load each field-value pair, one pair at a time, into the ring buffer at the element pointed to by the pointer, where the pointer is advanced a random number of times between each pair to be loaded;
- after all the field-value pairs have been loaded into the ring buffer, extract each field-value pair, one pair at a time, from the ring buffer at the element pointed to by the pointer, where the pointer is advanced a random number of times between each pair to be extracted; and
- for each extracted field-value pair, appending the second value to the first text string and appending, to the second text string, the first value followed by data that provides information on the location of the second value within the first text string.

\* \* \* \* \*